United States Patent [19]

Gerdt

[11] Patent Number: 5,671,191
[45] Date of Patent: Sep. 23, 1997

[54] VARIABLE COUPLER FIBER OPTIC SENSOR HYDROPHONE

[75] Inventor: David William Gerdt, Charlottesville, Va.

[73] Assignee: Sperry Marine Inc., Charlottesville, Va.

[21] Appl. No.: 376,342

[22] Filed: Jul. 6, 1989

[51] Int. Cl.$^6$ ................................................. H04R 23/00
[52] U.S. Cl. ........................... 367/140; 367/149; 73/705; 250/227; 350/96.15
[58] Field of Search ........................ 367/141, 149, 367/140; 73/705; 350/96.15, 96.22; 250/227, 231 R

[56] References Cited

U.S. PATENT DOCUMENTS

| | | | |
|---|---|---|---|
| 4,461,536 | 7/1984 | Shaw et al. | 367/140 |
| 4,482,805 | 11/1984 | Palmer | 250/227 |
| 4,495,819 | 1/1985 | Tekippe | 73/705 |
| 4,545,253 | 10/1985 | Avicola | 250/227 |
| 4,634,858 | 1/1987 | Gerdt et al. | 250/227 |
| 4,729,240 | 3/1988 | Sugihara et al. | 73/705 |

*Primary Examiner*—J. Woodrow Eldred
*Attorney, Agent, or Firm*—Seymour Levine

[57] ABSTRACT

A rigid plate with an aperture therethrough has a variable coupler fiber optic sensor encapsulated in the aperture by an encapsulant having an index of refraction that varies with applied stress. Incident light applied to an input fiber of the coupler is coupled to the output fibers thereof in a ratio dependent on the stress applied to the encapsulant. In an alternative embodiment, a well in a member superposed with respect to the plate is filled with a low bulk modulus material which abuts the encapsulant.

12 Claims, 1 Drawing Sheet

VARIABLE COUPLER FIBER OPTIC SENSOR HYDROPHONE

BACKGROUND OF THE INVENTION

1. Field of the Invention

The invention relates to hydrophones, particularly with respect to hydrophones utilizing optical sensors.

2. Description of the Prior Art

Present day hydrophones are primarily predicated on piezo-electric devices. The most generally utilized design employs a piezo-electric crystal such as lead zirconate titanate (PZT), which has been used almost exclusively for over forty years as the transducing element for hydrophones. Recently, consideration has been given to basing transducers on polymeric material, such as $PVF_2$ which functions as a piezo-electric device. Piezo-ceramic type elements have also been considered. Piezo-electric devices produce voltages with instantaneous amplitudes and frequencies that relate directly to the amplitude and frequency of the incoming acoustic waves impinging thereon.

Such piezo-electric hydrophones have been utilized in two modes; viz, an inertial mode and an impulsive mode. The inertial mode configuration is predicated on the inertial mass of the device resisting changes in displacement urged by impinging travelling acoustic waves. In the impulsive configuration, the transducer is rigidly mounted and produces an electrical output in accordance with the impinging acoustic impulse energy waves.

Piezo-electric transducer hydrophones suffer from a number of disadvantages. Such devices do not provide an indication of an applied steady state pressure; i.e., the devices do not operate in a DC mode. Piezo-electric devices are only sensitive to changes in pressure such as the successions of amplitude and frequency pressure changes of impinging acoustic waves.

Generally, piezo-electric transducer hydrophones tend to become increasingly insensitive, the lower the frequency of the impinging acoustic energy. Depending on the configuration of the device, there is no useable sensitivity below a low frequency cut-off. Devices designed to enhance low frequency sensitivity tend to be undesirably large and massive.

Additionally, since piezo-electric devices comprise electronic transducers, one-over-frequency (1/f) type noise (pink noise) composes a further limitation on the efficacy of such hydrophones. Furthermore, piezo-electric transducers are inherently very high impedance devices resulting in a significant amplitude of thermal (KT) noise. A further disadvantage of PZT and piezo-electric ceramic hydrophones is that such materials tend to be acoustically reflective. Thus, such sensors are readily detectable by active sonar and cannot be incorporated in anechoic coatings without modification to the coatings. Since the piezo-electric crystal and ceramic hydrophones have attained a high degree of development over many years, thereby achieving a sensitivity limit, incrementally small increases in sensitivity are attained only by undesirably large expenditures of funds.

Another disadvantage of the electrical sensor is that multiplexing many sensors into a large aperture array is very difficult and expensive. The increased acoustic performance of large arrays is known as "array gain".

Recently, the application of optical technologies to the hydrophone art has been considered. Such development has been limited to fiber optic devices for reasons primarily related to cost and the ease of multiplexing multiple sensors for array gain. Three types of sensors have been considered; viz, interferometric, intensity modulating and polarization modulating. Such sensors have been described in the IEEE Journal of Quantum Electronics, Vol. QE18, No. 4, "Optical Fiber Sensor Technology", pages 626–662 (1982). The interferometric sensor systems as well as the polarization sensors are exceedingly expensive. Although theoretical analysis shows interferometric sensor systems to be significantly more sensitive than PZT device systems, it has been extremely difficult or impossible for interferometric sensors to effect a transition from the laboratory to a practical environment. Interferometric and polarization sensors cost many tens of thousands of dollars whereas a high quality PZT sensor element or similar element such as $BaTiO_3$ costs less than $25.00. The intensity modulating fiber optic sensor hydrophone does not exhibit adequate performance to provide practical devices.

A variable coupler fiber optic sensor is disclosed in U.S. Pat. No. 4,634,858, issued Jan. 6, 1987, to D. W. Gerdt and L. H. Gilligan and is incorporated herein in its entirety. Fiber optic sensors offer advantages in DC and low frequency sensitivity, dynamic range, interference rejection, ease of multiplexing and low cost. Heretofore, however, such sensors, including the sensor of said U.S. Pat. No. 4,634,858, have not been applied to provide a practical hydrophone that overcomes the disadvantages described above.

SUMMARY OF THE INVENTION

The advantages of the prior art are overcome by a hydrophone comprising a member having a high inertial mass and an aperture therein. A fiber optic coupler, encapsulated in the aperture, has a plurality of optical fibers each having a core. The cores of the optical fibers are merged and fused in a waist region to form a common optical core wherefrom a plurality of output optical fibers emerge. The fiber optic coupler distributes light energy incident to one of the input optical fibers between the plurality of output optical fibers. The common optical core is encapsulated in the aperture by an encapsulant having a refractive index variable with stress applied thereto, such that the incident light energy is distributed between the plurality of output optical fibers as a function of stress applied to the encapsulant. The member in which the sensor is encapsulated has a substantially higher inertial mass than the encapsulant with the common optical core encapsulated therein. Preferably, the encapsulant comprises a stress birefringent elastomer.

DESCRIPTION OF THE PREFERRED EMBODIMENTS

Figures 1A, 1B:
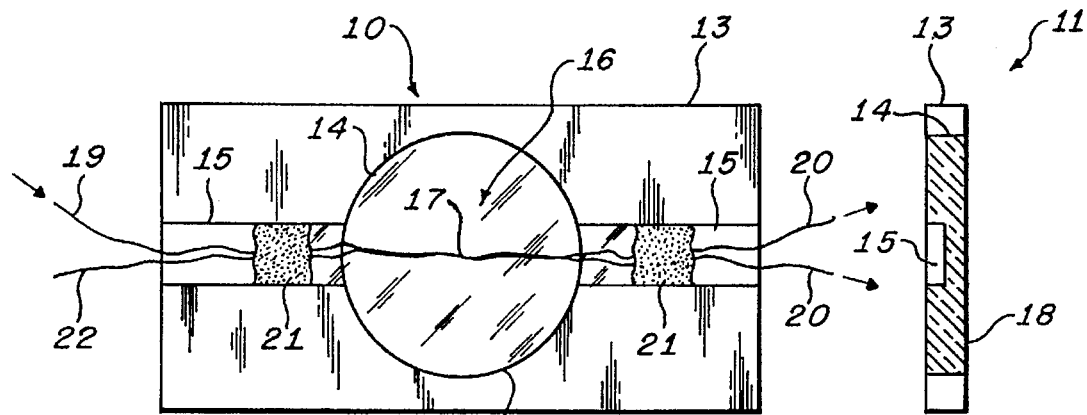
FIG. 1 is a plan, side and elevation view of a hydrophone of the inertial type implemented in accordance with the present invention.
Figure 1C:
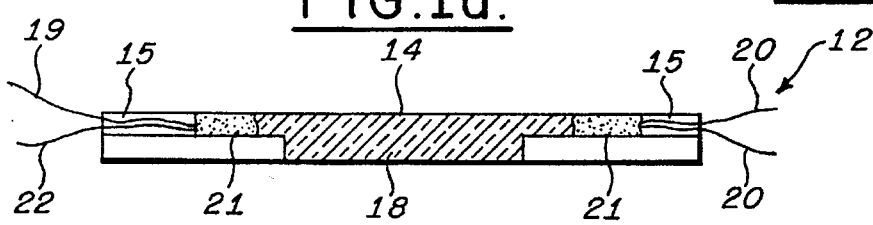

Referring to FIG. 1, a plan view 10, an edge elevation view 11 and a side elevation view 12 of an inertial type hydrophone constructed in accordance with the present invention is iillustrated. A support plate or structural member 13 has a large hole 14 drilled therethrough at the center thereof for supporting the elastomer of the variable coupler fiber optic sensor to be mounted therein. The plate 13 is comprised of a suitable rigid material such as aluminum or plexiglas. The plate 13 may be rectangular or any other suitable shape. A rectangular plate 5 inches long, 2½ inches wide and ¼ inch thick may be utilized with the hole 14 being 2 inches in diameter. Two slots or troughs 15 are milled in the plate 13 to hold the input and output optical fibers of the coupler fastened by epoxy anchors, in a manner to be described.

A variable coupler fiber optic sensor 16 having a waist region or joint 17 of the type described in said U.S. Pat. No. 4,634,858 is drawn utilizing either flame or preferably an electric fusion furnace. The preferred methods and techniques for drawing the coupler 16 are described in U.S. patent application Ser. No. 240,986, filed Sep. 6, 1988, entitled "Fiber Optic Fabrication Furnace" by D. W. Gerdt. A stress sensitive encapsulant 18 fills the hole 14 and part of the troughs 15 to surround the coupler 16. The encapsulant 18 is preferably a stress birefringent material such as an elastomer. Room temperature vulcanizing (RTV) material maybe utilized such as General Electric Company RTV-12. The coupler includes an input optical fiber 19 and output optical fibers 20 anchored in the troughs 15 by a suitable material 21 such as epoxy. As explained in said U.S. Pat. No. 4,634,858, the coupler 16 also includes an optical fiber 22 at the input thereof which is not utilized in the functioning thereof.

An embodiment of the invention utilizes Corning XSMF fiber which is single mode at approximately 850 NM. Other wavelengths such as 1300 NM or 1550 NM may also be employed in practicing the invention providing the appropriate single mode fiber is utilized. In construction, the coupler 16 is preferably drawn to the extent that immersion in RTV-12 results in a ratio of output optical power levels from the fibers 20 of approximately unity. This is desirable for effecting maximum linear dynamic range for the device. The sensitivity of the hydrophone is a function of the thickness of the membrane 13. Very thin membranes or diaphragms result in very sensitive hydrophones. The hydrophone may be made less sensitive by utilizing a rigid relatively thick membrane 13 or by loading the elastomer 18 with small massive particles such as tungsten dust.

In the operation of the inertial type hydrophone of FIG. 1, the device is suspended from a wire or string and lowered into the water. Acoustic waves impinging on the device cause the elastomer 18 to follow the amplitude and frequency thereof since the elastomer 18 is of low inertial mass. Since the support plate 13 is of high inertial mass, it tends to resist motion in response to the impinging acoustic waves. Strain is thereby caused in the membrane which results in changes in the coupling ratio of the coupler 16.

Figures 2A, 2B:
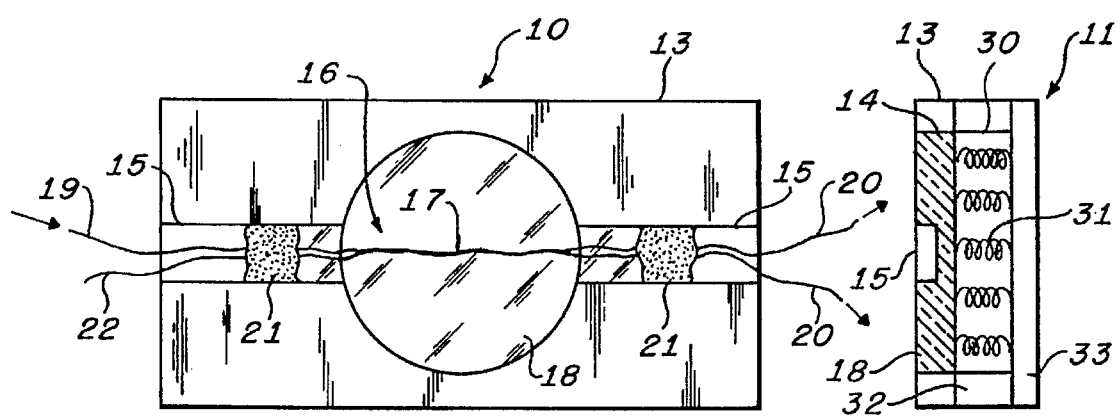
FIG. 2 is a plan, side and elevation view in cross-section of a hydrophone of the impulsive type implemented in accordance with the present invention.
Figure 2C:
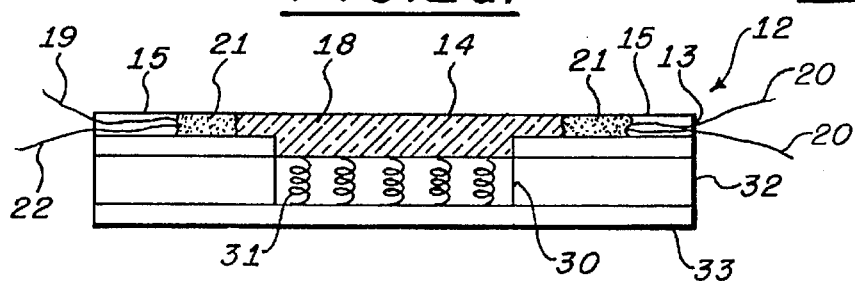

Referring to FIG. 2, in which like reference numerals indicate like elements with respect to FIG. 1, an impulsive semi-rigid thick membrane type of hydrophone is illustrated. The impulsive type hydrophone of FIG. 2 is identical to the inertial type of FIG. 1 with respect to the similarly numbered elements. The impulsive type hydrophone of FIG. 2, however, instead of being open on both sides, as is the inertial type of FIG. 1, includes a well or hole 30 filled with a low bulk modulus material 31. The low bulk modulus material 31 is represented by a plurality of soft springs. The material 31 may comprise nematic liquid crystal or other spongy material including trapped air. The well 30 is formed in a member 32 comprised of aluminum or other rigid material. The material of the members 13, 21, 18, 32, 33, or other elements may be acoustically matched to water or other fluid. Acoustic matching would imply acoustic transparency at the pertinent frequency or frequencies. The hydrophone of FIG. 2 is completed by a bottom plate 33.

In operation, unlike the hydrophone of FIG. 1 which is freely suspended, the hydrophone of FIG. 2 is preferably rigidly attached to another structure such as the hull of a ship. Accordingly, acoustic energy impinging on the sensor endeavors to push and pull the sensor with the amplitude and frequency of the incoming wave or pulse. The body of the sensor, being essentially incompressible and rigidly mounted, remains unaffected while the elastomer 18, being poorly supported by the well 30 of spongy material 31, follows the pressure oscillations of the acoustic wave. Since these motions of the elastomer 18 in following the acoustic wave causes strain in the membrane, the optical coupling ratio of the coupler 16 varies with the amplitude and frequency of the incoming wave. When freely suspended or neutrally buoyant, the hydrophone of FIG. 2 performs as a pressure hydrophone, responding to the alternate compressional and rarefactional oscillations characteristic of underwater sound.

It is appreciated from the foregoing that the invention is a fiber optic sensor configured as a transducer of acoustic energy to electrical energy utilizing interactions involving the optical properties of the coupler of said U.S. Pat. No. 4,634,858. The hydrophone acoustic sensor of the present invention operates from sub-hertz infrasound through frequencies higher than 10 KHz. By utilizing a fiber optic sensor based on the concept of sensing strain in the vicinity of an encapsulated single mode coupler joint, numerous advantages are obtained over the above-described prior art. Such advantages include greatly enhanced low frequency response, sensitivity superior to all conventional hydrophone designs and prior art optical techniques, steady state or DC response, wide dynamic range, linearity, simplicity, low cost, ease of manufacturing, ease of multiplexing, immunity to electrical noise, absence of pink noise and orders of magnitude lower thermal and other noise.

Another advantage of the invention is acoustic transparency. Since RTV and other elastomers may be fabricated so as not to reflect acoustic energy, the above-described sensors, if so designed, cannot be detected by active sonar. These sensors fabricated in accordance with the present invention may be attached to anechoic coatings without modifying the coatings.

It had been anticipated that the shortcomings of the piezo-electric hydrophone design would be overcome by optical soluttions. Until the present invention, however, a practical operative hydrophone had not been forthcoming. The present invention configures the variable coupler fiber optic sensor of said U.S. Pat. No. 4,634,858 into a new and useful hydrophone with superior qualities. Thus, the hdyrophone of the present invention is applicable as the sensing element for disposable sonabouys, as the sensing elements for arrays, both tethered and towed, as a self-noise monitoring device for quiet ships, for extremely sensitive low frequency detection of ships and vessels, as a geophysical device for recording background steady state noise or earthquake type noise and as a sensor for collection of signatures for the above-described applications. The sensor of the present invention may be utilized as a microphone or geophone.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An acoustic sensing device comprising
   a rigid plate having a high inertial mass and an aperture completely disposed therethrough, a fiber optic coupler encapsulated in said aperture having a plurality of input optical fibers each having a core, said cores of said optical fibers being merged and fused in a waist region to form a common optical core wherefrom a plurality of output optical fibers emerge, said fiber optic coupler for distributing light energy incident to one of said input optical fibers between said plurality of output optical fibers, and encapsulate means for encapsulating said common optical core in said aperture, said encapsulant means having refractive index variable with stress applied thereto, such that said incident light energy is distributed between said plurality of output optical fibers as a function of stress applied to said encapsulant means, said rigid plate having a substantially higher inertial mass than said encapsulant means with said common optical core encapsulated therein, a member having a well therein or positioned with respect to said rigid plate so that said well is adjacent said aperture, and a low bulk modulus material filling said well and abutting said encapsulant means.

2. The device of claim 1 wherein said encapsulant means comprises a stress birefringent silicon elastomer.

3. The device of claim 1 wherein said plate has slots disposed therein with said input and output optical fibers anchored in said slots.

4. The device of claim 1 wherein said plate has slots disposed therein with said input and output optical fibers anchored in said slots by epoxy.

5. The device of claim 1 wherein said low bulk modulus material comprises a spongy material.

6. The device of claim 1 wherein said low bulk modulus material comprises nematic liquid crystal material.

7. The device of claim 1 wherein said low bulk modulus material comprises entrapped air.

8. The device of claim 1 wherein said encapsulant means comprises encapsulant material with powdered mass particles distributed therein.

9. The device of claim 1 further including a mass affixed externally to said encapsulant means.

10. The device of claim 1 further including a mass affixed internally in said encapsulant means.

11. The device of claim 1 wherein said acoustic sensing device is so shaped to provide resonant energy reinforcement for increased sensitivity at a particular frequency or frequencies.

12. The device of claim 1 wherein said acoustic sensing device is so shaped to provide resonant energy reinforcement for increased sensitivity at a particular frequency or frequencies.

* * * * *